United States Patent [19]

Yang et al.

[11] 4,197,285

[45] Apr. 8, 1980

[54] REGENERATION OF LIME FROM SULFATES FOR FLUIDIZED-BED COMBUSTION

[75] Inventors: Ralph T. Yang, Middle Island; Meyer Steinberg, Huntington Station, both of N.Y.

[73] Assignee: The United States of America as represented by the United States Department of Energy, Washington, D.C.

[21] Appl. No.: 858,221

[22] Filed: Dec. 7, 1977

[51] Int. Cl.$^2$ .............. C01B 13/14; C01F 5/02; C01B 17/00; B01J 8/00
[52] U.S. Cl. .................................. 423/638; 423/244
[58] Field of Search .................. 423/242, 244, 638

[56] References Cited

U.S. PATENT DOCUMENTS

| | | | |
|---|---|---|---|
| 3,784,676 | 1/1974 | Moss | 423/242 |
| 4,060,588 | 11/1977 | Mandelik | 423/242 |
| 4,081,522 | 3/1978 | Hubble | 423/638 |

*Primary Examiner*—O. R. Vertiz
*Assistant Examiner*—Gregory A. Heller
*Attorney, Agent, or Firm*—R. V. Lupo; Leonard Belkin; Cornell D. Cornish

[57] ABSTRACT

In a fluidized-bed combustor the evolving sulfur oxides are reacted with CaO to form calcium sulfate which is then decomposed in the presence of carbonaceous material, such as the fly ash recovered from the combustion, at temperatures of about 900° to 1000° C., to regenerate lime. The regenerated lime is then recycled to the fluidized bed combustor to further react with the evolving sulfur oxides. The lime regenerated in this manner is quite effective in removing the sulfur oxides.

9 Claims, 2 Drawing Figures

REGENERATION OF LIME FROM SULFATES FOR FLUIDIZED-BED COMBUSTION

FIELD OF THE INVENTION

This invention relates to improvements in the fluidized-bed combustion of coal. Specifically, this invention relates to a novel lime regenerative process in the fluidized-bed cumbustion of coal.

BACKGROUND OF THE INVENTION

There is described in the prior art several methods for breaking down calcium sulfate in an effort to obtain lime and sulfur oxides.

In Wheelock et at I, U.S. Pat. No. 3,087,790 granted Apr. 30, 1963 and Wheelock et al II, U.S. Pat. No. 3,260,035, granted July 12, 1966, there is disclosed the decomposition of calcium sulfate, by heating the calcium sulfate with reducing gases to a relatively high temperature to produce sulfur dioxide and lime, cooling and clearing the gas, and converting the sulfur dioxide via the normal contact process into sulfuric acid.

In the article "Sulfuric Acid from Anhydrate" by W. Q. Hull et al, Industrial Engineering Chemistry, vol. 49, pp. 1207-1214 (1957), there is discussion relating to the decomposition of calcium sulfate in the presence of solid carbon, such as charcoal or coke in kilns, in the cement-sulfuric acid process. Another approach is disclosed in Gorin, U.S. Pat. No. 3,729,551, granted Apr. 24, 1973 wherein calcium sulfate is converted to lime in two stages, the first stage is a separate reduction stage wherein a fluidized bed of relatively coarse calcium sulfate is converted to calcium sulfide by means of hydrocarbonaceous solids and air in a bed, and the second, is a separate oxidation stage wherein CaS from the first stage is converted to CaO and $SO_2$.

It is also known in the prior art that alkaline earth metal oxides may be used to remove sulfur dioxide from stack gases. In Thornton, U.S. Pat. No. 3,475,121, granted Oct. 28, 1969, there is described a process wherein the alkaline earth oxide reacts with the $SO_2$ to form the corresponding sulfite. The sulfite is separated and then decomposed to recover $SO_2$ and the metal oxide, which metal oxide is then recycled to the adsorption step.

Specifically as related to the fluidized-bed combustion of coal, it was also desirable to remove the evolving sulfur oxides. Limestone was suggested as a possible material for removal of sulfur oxides. Attendant high limestone requirements, to wit, Ca/S ratios in excess of two, prompted efforts towards the development of a regeneration system. Certain regeneration systems were based on the aforesaid Wheelock et al I and II reductive decomposition. Such systems required high regeneration temperatures (1100° C.), relatively high quantities of the carbon gases, with low concentrations of product $SO_2$.

There is now provided by the present invention a process for lime regeneration from sulfated limestone based on a solid carbon reaction with the sulfated limestone.

It is therefore a principal object of this invention to provide a process for regenerating lime for a fluidized-bed combustion system, which regeneration process is based on a carbon-sulfated lime reaction.

It is another object of this invention to provide the process as immediately aforesaid wherein the ash recovered from the fluidized-bed reaction is utilized in the lime regenerative process.

It is another object of this invention to provide a process for the regeneration of lime from sulfated lime in essentially a single kiln operation.

It is another object of this invention to provide a process for the regeneration of lime wherein the unburnt carbon in the FBC fly ash may be effectively utilized and the need for a separate carbon burn-up cell as described in the U.S. Pat. No. 3,508,506 is reduced or eliminated.

It is another object of this invention to provide a process for the regeneration of lime in a kiln wherein the lime suffers less attrition than lime regenerated in a second fluidized-bed reactor.

It is still another object of this invention to provide a process for the regeneration of lime in a fluidized-bed combustion system, wherein the temperatures of regeneration are lower than heretofore.

It is still another object of this invention to provide a process for the regeneration of lime in a fluidized-bed combustion system wherein the regenerated lime has a higher reactivity than lime regenerated at the higher temperatures used heretofore.

It is still a further object of this invention to provide a process for the regeneration of lime in a fluidized-bed combustion system, wherein the sulfur dioxide gases emanating from the regenerator kiln, are in relatively high concentrations.

It is also an object of this invention to provide a process for the regeneration of lime in a fluidized-bed coal combustion system which is ecologically sound while being commercially feasible.

The aforesaid as well as other objects and advantages will be made apparent from the reading of the continuing specification, adjoined claimed; and the accompanying drawings in which:

Broadly speaking, the process of this invention comprises reacting the $CaSO_4$ from a fluidized-bed coal combustion with carbonaceous material to form CaO and $SO_2$ and then recycling the regenerated CaO to the fluidized-bed combustion.

In a preferred aspect of the invention the carbonaceous material is obtained from the fly ash recovered from the gaseous combustion products of the fluidized-bed combustion (FBC). The fly ash may contain from about 5 to 40% by weight of carbon.

An important aspect of this invention is that regeneration reaction is carried out at relatively low temperatures of 850° C. to 1100° C. and preferably between 900° C. and 1000° C. The regenerated lime at these temperatures is directly useful in the FBC which is normally maintained at 800° C. to 950° C., without the need for cooling the lime.

In the practice of this invention, the regeneration reaction is preferably carried out in a kiln, such as by way of example, a horizontal rotary kiln, and it is desirable to mix the solid $CaSO_4$ and C reactants during reaction as well as prior to reaction in the kiln.

The basic chemistry for the regeneration process is:

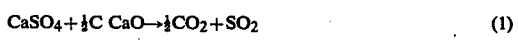

$$CaSO_4 + \tfrac{1}{2}C\ CaO \rightarrow \tfrac{1}{2}CO_2 + SO_2 \qquad (1)$$

which is a two-step reaction:

It has been shown that reaction 2 is much faster than reaction 3, and that the ratio of C/Ca is important in controlling the product (CaO vs. CaS).

Reaction 3 is the overall rate-limiting step. The rate of 3 controls the rate of regeneration of CaO. Without wishing to be bound by any theory, it is proposed that a surface layer on the CaSO₄ is first reduced rapidly by carbon via reaction 2. The reduced layer then reacts with the remaining inner CaSO₄ to form CaO via reaction 3. The activation energy of reaction 3 is 62.7 kcal/mole CaO which indicates a solid-phase diffusion and/or chemical reaction rate-limiting mechanism. This overall temperature dependence also means that the rate of regeneration of CaO is increased by a factor of three per 50° C. rise in temperature in this temperature range.

Figure 1:
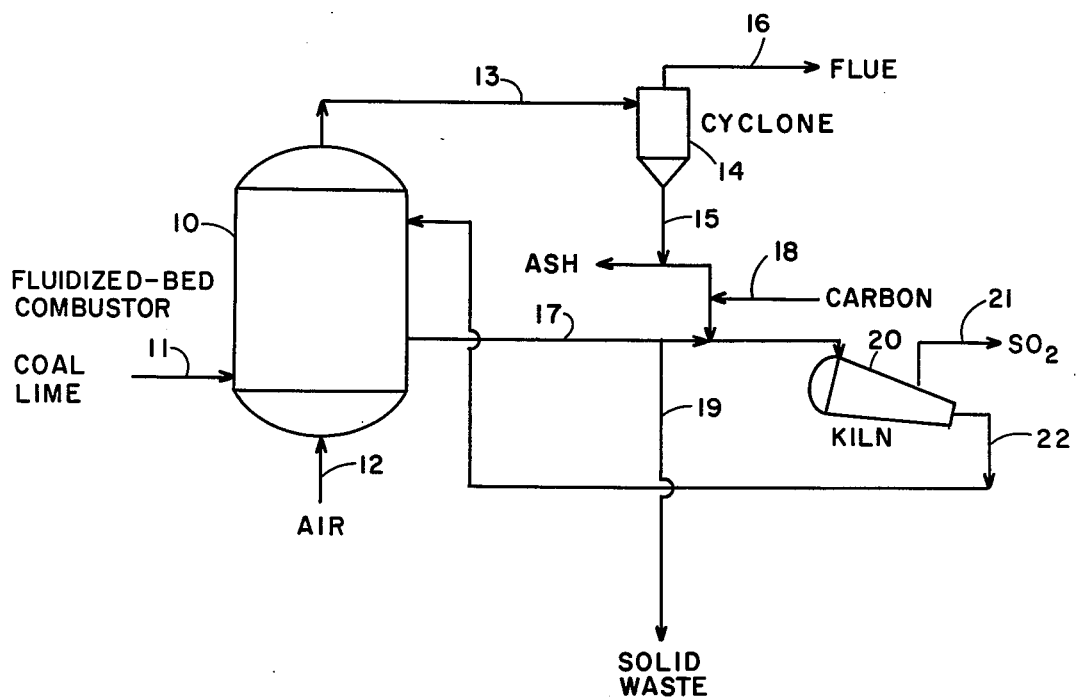
FIG. 1 is a schematic illustration of the process of this invention.

Referring now to FIG. 1 there is shown a schematic illustration of the process of the present invention. The fluidized-bed combustion (FBC) 10 is shown wherein the coal and make-up lime is fed to FBC through line 11 and air is fed to FBC through line 12. The FBC is maintained at 800° C. to 950° C. and at 1 to 10 atmospheres. Gases of combustion are passed by line 13 to cyclone separator 14 whereat the fly ash 15 is separated out from the gaseous materials 16, for reasons which will be more fully explained hereafter.

Sulfated and partially sulfated lime is removed at line 17 which is admixed with the solid ash and (optionally) make-up carbon 18, and the solid mixture is fed to horizontal rotary kiln 20. Excess sulfated lime is removed as waste 19. Kiln 20 is maintained at 800° C. to 1100° C. and at 1 to 10 atmospheres. The solid mixture undergoes further mixing during reaction in kiln 20, and the exit gases containing sulfur dioxide are removed at 21. The solids 22 containing regenerated lime are returned to FBC 10.

In another specific preferred aspect of the invention, an oxygen-containing gas such as air may be reacted in a stoichiometric proportion with the excess carbon in the regeneration kiln to provide by an exothermic reaction, sufficient heat to maintain the endothermic regenerative reaction. The regenerator kiln is maintained at 1 to 10 atmospheres at which pressures the exothermic reaction can proceed. Alternatively, the excess carbon burning can be outside the regenerator with heat exchange means providing the reaction temperature for the regeneration.

It is also within the contemplation of this invention to emloy other alkaline earth oxides and sulfates in addition to the calcium oxide-calcium sulfate system. Such other systems include, MgO-MgSO₄, dolomite and blends of magnesium and calcium oxides.

Carbonaceous materials useful pursuant to the present invention include fly ash from FBC, solid carbon, coal, char, coke breeze, culm, graphite, and the like. The carbon should be present in a finely divided form of below 100 mesh (Tyler screen).

The process is further described in the following examples.

EXPERIMENTAL EXAMPLE 1

Greer limestone was first calcined at 900° C. in dry N₂ and then sulfated at 900° C. with a gas containing 5% SO₂, 10% O₂ in dry N₂. The calcination and sulfation were both carried out in static beds. The sulfation was 65% to 80% complete of the theoretical. Ash containing 7% unburnt carbon from Illinois No. 6 coal of a −200 +270 mesh (Tyler screen) was mixed with the sulfated Greer limestone of −16 +20 mesh (Tyler screen) and reacted at temperatures between 850° C. and 1000° C., in several separate reactions. After each reaction, the ash was sieved out and the stone analyzed by X-ray diffraction. All X-ray diffraction analyses showed CaO to be the predominant product.

EXPERIMENTAL EXAMPLE II

Figure 2:
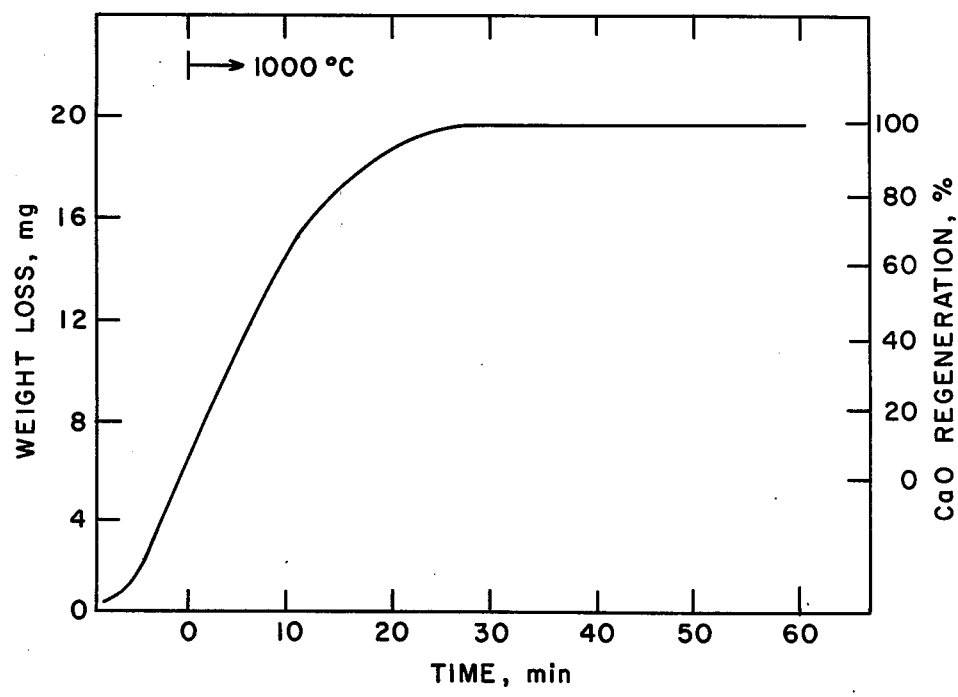
FIG. 2 is a graph of the rate of regeneration in an example of the present invention.

A 100 mg. sample of a Greer limestone from a fluidized bed combustor, which was 30% sulfated was reacted with 18.9 mg. of Illinois No. 6 coal ash having 7% by weight carbon as finely divided solids of −200 +270 mesh (Tyler screen) at 1000° C. The sample weight loss was measured with time, and a plot of the CaO regeneration as a function of time was made and is presented as FIG. 2.

It is seen that more than 90% of the sulfated lime was regenerated within 20 minutes, and about 70% was regenerated in 7 minutes.

THEORETICAL EXAMPLE

Illinois No. 6 coal containing 3% by weight of sulfur and 10% by weight ash is fed to a Fluidized-Bed Combustor (FBC) with regenerated lime in a Ca/S ratio of 2.3. Fresh limestone, at 10% by weight of the regenerated lime, is also fed to the FBC as make-up lime to compensate for process losses. Sulfated lime from the FBC is mixed with fly ash collected by a cyclone collector and the solids mixture is fed to a horizontal rotary kiln maintained at 1000° C. The unburned carbon in the fly ash is 15% by weight. A stream of air is fed to the kiln to react with excess carbon in the fly ash and to provide heat of reaction for the kiln. The regenerated solids are fed from the kiln at 1000° C. back to the FBC.

Off-gas from the kiln contains 4% SO₂ and is available for commercial sulfur recovery operations. Approximately 5% of the lime from the FBC is streamed-off as waste.

The overall Ca/S ratio in this system is 0.13.

What is claimed is:

1. A process for the regeneration of lime in the fluidized-bed combustion of coal comprising:
   (a) combusting coal containing sulfurous material in a fluidized-bed combustor forming SO₂ in the presence of fluidized bed particulates comprising CaO, wherein the CaO is reacted with the combustion SO₂ to form CaSO₄;
   (b) reacting the particulates comprising the CaSO₄ from the combustor, at a temperature from about 850° C. to about 1100° C., with solid carbonaceous material to form CaO wherein the carbonaceous material comprises fly ash recovered from fluidized-bed co nbustion; and
   (c) recycling the particulates comprising the regenerated CaO at substantially the temperature of step (b) to the fluidized bed combustor.

2. The process of claim 1, wherein the reaction of step (b) is in a kiln.

3. The process of claim 1, wherein the pressure of the reaction of step (b) is from 1 to 10 atmospheres.

4. The process of claim 1, wherein the carbonaceous material is a finely divided solid.

5. The process of claim 1, further comprising, providing a flow of an oxygen-containing gas to react with carbon in the fly ash to maintain the reaction of step (b) at a temperature of from about 850° C. to 1100° C.

6. The process of claim 1, wherein the temperature of the particulates comprising CaO in step (b) is about the same as the temperature of the fluidized-bed combustion in step (a).

7. The process of claim 1, further comprising recovering the carbonaceous material as a finely divided solid, and then mixing the said solid with the solid particulates comprising $CaSO_4$ in the step (b) reaction.

8. The process of claim 1, wherein the fluidized-bed combustor is at 800° C. to 950° C.

9. The process of claim 2, wherein the fluidized-bed particulates of step (a) are fed directly to the kiln of step (b).

* * * * *